United States Patent
Jose et al.

(10) Patent No.: US 12,361,115 B1
(45) Date of Patent: Jul. 15, 2025

(54) ARTIFICIAL INTELLIGENCE BASED (AI-BASED) SYSTEM AND METHOD POWERED BY LARGE LANGUAGE MODELS (LLMS) FOR MONITORING USERS DURING TASKS PERFORMED BY THE USERS

(71) Applicant: Talview Inc, San Mateo, CA (US)

(72) Inventors: Sanjoe Tom Jose, Edmond, OK (US); Subramanian Kailasam, Redwood City, CA (US)

(73) Assignee: Talview Inc, San Mateo, CA (US)

( * ) Notice: Subject to any disclaimer, the term of this patent is extended or adjusted under 35 U.S.C. 154(b) by 0 days.

(21) Appl. No.: 19/011,802

(22) Filed: Jan. 7, 2025

Related U.S. Application Data

(60) Provisional application No. 63/700,828, filed on Sep. 30, 2024.

(51) Int. Cl.
    G06F 21/50  (2013.01)
    G06F 21/00  (2013.01)

(52) U.S. Cl.
    CPC .................... *G06F 21/50* (2013.01)

(58) Field of Classification Search
    CPC ........ G06F 21/50; G06F 21/52; G06F 21/552; G06F 21/554; G06F 21/556; G06F 21/57; G06F 21/577
    See application file for complete search history.

(56) References Cited

U.S. PATENT DOCUMENTS

2021/0352090 A1* 11/2021 Kim .................... H04L 67/025
2023/0164567 A1* 5/2023 Fellows ............. H04L 63/1416
                                                    455/410

* cited by examiner

*Primary Examiner* — Edward Zee
(74) *Attorney, Agent, or Firm* — Jason C. Cameron

(57) ABSTRACT

An AI-based method and system for automatically monitoring first users during tasks performed by the first users, are disclosed. The AI-based method includes obtaining data associated with media contents from first communication devices associated with first users. The AI-based method further includes processing the data associated with the media contents to determine abnormal behaviors of the first users, using AI models. The AI-based method further includes generating alerts corresponding to the abnormal behaviors, to be provided to the first communication devices associated with the first users and second communication devices associated with second users. The AI-based method further includes terminating the tasks performed by the first users to prevent continuous violations on the tasks when a level of the abnormal behaviors exceed a pre-defined threshold. The AI-based method further includes generating outputs comprising information to be provided to the first users and second users.

18 Claims, 4 Drawing Sheets

ARTIFICIAL INTELLIGENCE BASED (AI-BASED) SYSTEM AND METHOD POWERED BY LARGE LANGUAGE MODELS (LLMS) FOR MONITORING USERS DURING TASKS PERFORMED BY THE USERS

CROSS REFERENCE TO RELATED APPLICATION(S)

This application claims the priority to and incorporates by reference the entire disclosure of U.S. provisional patent application bearing No. 63/700,828 filed on Sep. 30, 2024 and tilted "AN AI-POWERED PROCTORING AGENT FOR SECURE, AUTOMATED MONITORING IN EXAMINATIONS AND JOB INTERVIEWS".

TECHNICAL FIELD

Embodiments of the present disclosure relate to remote monitoring systems and more specifically to an artificial intelligence-based system and method for real-time remote proctoring or monitoring of one or more first users in diverse applications, including but not limited to education, professional certifications, government regulatory assessments, and secure corporate environments.

BACKGROUND

In the modern era of education, professional certification, and recruitment, the shift towards online learning, remote testing, and virtual job interviews has grown exponentially. As institutions, organizations, and companies adopt digital platforms for conducting exams and interviews, the challenge of ensuring integrity in an unsupervised, remote environment has become increasingly critical. Traditional in-person proctoring, where exam administrators supervise candidates, is no longer feasible in many cases due to geographic limitations, scalability concerns, and cost constraints. This has led to the development and widespread use of online proctoring solutions aimed at replicating the role of in-person proctors through digital means.

One of the earliest remote supervision systems and methods involved exam administrators monitoring candidates via real-time video streams. However, these systems allow proctors to monitor only a limited number of candidates simultaneously, creating scalability challenges for large-scale sessions with hundreds or even thousands of candidates. This limitation has driven the need for more efficient solutions capable of handling a larger volume of candidates.

To address the scalability issue, automated proctoring solutions were introduced. These systems monitor candidates through cameras and microphones without requiring live proctor oversight. Despite their advantages, such systems have several shortcomings, including limited monitoring capabilities, a tendency to generate false positives, and an inability to interact with or assist candidates in real time-tasks that human proctors would typically handle.

Another common approach involves recording the entire exam or interview session, including video, screen activity, and audio feeds, for later review. After the session, administrators analyze flagged segments for potential violations. However, this post-exam review process is time-consuming and often delays results, especially when multiple incidents are flagged, requiring extensive manual review by exam administrators.

In conclusion, while several solutions exist for remote supervision, these solutions come with significant trade-offs in terms of cost, scalability, accuracy, and candidate experience. Many systems fail to strike a balance between providing real-time, accurate detection of prohibited behaviors, preventing AI-assisted cheating, and offering candidates a seamless and stress-free experience.

Therefore, there is a need for an artificial intelligence based (AI-based) system and method for real-time remote proctoring or monitoring of one or more first users during one or more tasks including at least one of: examinations, job interviews, or similar high-stakes assessment scenarios, in order to address the above mentioned issues.

SUMMARY

This summary provides an introduction to key concepts described in greater detail in the following sections of the disclosure. It is not intended to highlight the essential inventive concepts or to define the scope of the invention.

In accordance with an embodiment of the present disclosure, an artificial intelligence based (AI-based) using one or more AI models, including but not limited to Large Language Models (LLMs) method for automatically monitoring one or more first users during one or more tasks performed by the one or more first users, is disclosed. The AI-based method comprises obtaining, by one or more hardware processors, data associated with one or more media contents from one or more first communication devices associated with one or more first users.

The AI-based method further comprises processing, by the one or more hardware processors, the data associated with the one or more media contents to determine one or more abnormal behaviors of the one or more first users during the one or more tasks performed by the one or more first users, using one or more AI models, including but not limited to the LLMs. The AI-based method further comprises generating, by the one or more hardware processors, one or more alerts, recommendations, or predictive insights for detecting, responding to, or mitigating abnormal behaviors herein after referred to as alerts, to be provided to at least one of: the one or more first communication devices associated with the one or more first users and one or more second communication devices associated with one or more second users.

The AI-based method further comprises terminating, by the one or more hardware processors, the one or more tasks performed by the one or more first users to prevent continuous violations on the one or more tasks when a level of the one or more abnormal behaviors exceed a pre-defined threshold. The AI-based method further comprises generating, by the one or more hardware processors, outputs, including reports, actionable recommendations, real-time dashboards, and system adaptations for enhanced monitoring and compliance hereinafter referred to as outputs based on at least one of: the processed data associated with the one or more media contents, one or more real-time interactions occurred between the one or more AI models, including but not limited to LLMs, and the one or more first communication devices associated with the one or more first users, and one or more automated decisions made by one or more AI models, including but not limited to LLMs on the one or more tasks.

In an embodiment, processing the data associated with the one or more media contents to determine the one or more abnormal behaviors, using the one or more AI models (e.g., LLMs), comprises: (a) obtaining, by the one or more hardware processors, the data associated with the one or more media contents, from a data obtaining subsystem; (b) generating, by the one or more hardware processors, one or more patterns corresponding to the data associated with the one or more media contents; (c) determining, by the one or more hardware processors, whether the generated one or more patterns deviate from one or more protocols associated with the one or more tasks; and (d) determining, by the one or more hardware processors, the one or more abnormal behaviors from the one or more first users during the one or more tasks performed by the one or more first users when the generated one or more patterns deviate from the one or more protocols associated with the one or more tasks.

In another embodiment, the AI-based method further comprises fine-tuning, by the one or more hardware processors, the one or more AI models (e.g., LLMs). Fine-tuning the LLMs comprises: (a) obtaining, by the one or more hardware processors, one or more fine-tuning datasets comprising of historical, real-time, or dynamically generated data sets, adaptable to emerging machine learning techniques hereinafter referred to as data; (b) fine-tuning, by the one or more hardware processors, the LLMs with the data associated with one or more historical media contents, to learn the one or more patterns corresponding to the data associated with the one or more media contents; and (c) determining, by the one or more hardware processors, the one or more abnormal behaviors from the one or more first users during the one or more tasks based on the fine-tuned LLMs.

In yet another embodiment, the AI-based method further comprises dynamically detecting, by the one or more hardware processors, the one or more abnormal behaviors of the one or more first users during the one or more tasks, using the one or more AI models, by: (a) obtaining, by the one or more hardware processors, the data associated with one or more visual contents from one or more camera devices configured in the one or more first communication devices; (b) processing, by the one or more hardware processors, the data associated with the one or more visual contents to analyze at least one of: one or more behaviors of the one or more first users and one or more environments where the one or more tasks are conducted, using the one or more AI models; (c) comparing, by the one or more hardware processors, one or more behavioral patterns associated with at least one of: the one or more behaviors of the one or more first users and the one or more environments, with one or more pre-determined behavioral patterns associated with at least one of: one or more historical behaviors of the one or more first users and one or more historical environments where the one or more tasks are conducted, using the one or more AI models; and (d) dynamically detecting, by the one or more hardware processors, the one or more abnormal behaviors of the one or more first users during the one or more tasks when the one or more behavioral patterns exceed a threshold value associated with the one or more pre-determined behavioral patterns.

In yet another embodiment, the one or more visual contents of the one or more abnormal behaviors of the one or more first users comprise at least one of: one or more facial expressions, one or more micro-expressions indicating stress, discomfort of the one or more first users, one or more false activities, frequent looks away from a screen, one or more inconsistent body movements of the one or more first users, one or more humans entering into the one or more environments, unauthorized devices available in the one or more environments, and changes in lightings during which the one or more first users violate the one or more protocols associated with the one or more tasks.

In yet another embodiment, the AI-based method further comprises detecting, by the one or more hardware processors, the one or more abnormal behaviors of the one or more first users during the one or more tasks, using the one or more AI models, by: (a) obtaining, by the one or more hardware processors, the data associated with one or more audio contents from one or more audio capturing devices configured in the one or more first communication devices; (b) identifying, by the one or more hardware processors, an unauthorized collaboration in the one or more environments where the one or more tasks are conducted, wherein the unauthorized collaboration is identified by recognizing at least one of: one or more voices and one or more cues of the humans, excluding the one or more first users in the one or more environments; (c) comparing, by the one or more hardware processors, one or more predetermined ambient sounds in the one or more environments with the recognized at least one of: one or more voices and one or more cues of the humans in the one or more environments, using a speech recognition and semantic analysis technique; and (d) detecting, by the one or more hardware processors, the one or more abnormal behaviors of the one or more first users during the one or more tasks by differentiating the one or more predetermined ambient sounds and the one or more voices of the humans, in the one or more environments.

In yet another embodiment, the AI-based method further comprises validating, by the one or more hardware processors, one or more responses associated with the one or more tasks performed by the one or more first users, using the one or more AI models, by: (a) obtaining, by the one or more hardware processors, the one or more responses associated with the one or more tasks from the one or more first users, wherein the one or more responses comprise at least one of: one or more written contents and one or more spoken contents, in response to the one or more tasks; (b) determining, by the one or more hardware processors, originality of the one or more responses by comparing the one or more responses with one or more prestored datasets comprising one or more prestored responses, using the LLMs; and (c) validating, by the one or more hardware processors, the one or more responses associated with the one or more tasks based on the determination of the originality of the one or more responses.

In yet another embodiment, the AI-based method further comprises communicating, by the one or more hardware processors, one or more real-time instructions to the one or more first users during the one or more tasks, using the LLMs. In an embodiment, communicating the one or more real-time instructions comprise at least one of: providing timely instructions and reminders about the one or more protocols associated with the one or more tasks, providing answers to one or more procedural questions during the one or more tasks, and providing the one or more alerts when the one or more first users exhibit the one or more abnormal behaviors.

In an aspect, an artificial intelligence based (AI-based) system for automatically monitoring one or more first users during one or more tasks performed by the one or more first users, is disclosed. The AI-based system includes one or more hardware processors and a memory coupled to the one or more hardware processors. The memory includes a plurality of subsystems in the form of programmable instructions executable by the one or more hardware processors.

The plurality of subsystems comprises a data obtaining subsystem configured to obtain data associated with one or more media contents from one or more first communication devices associated with one or more first users. The plurality of subsystems further comprises a data processing subsystem configured to process the data associated with the one or more media contents to determine one or more abnormal behaviors of the one or more first users during the one or more tasks performed by the one or more first users, using one or more AI models (e.g., Large Language Models (LLMs)).

The plurality of subsystems further comprises an alert generating subsystem configured to: (a) generate one or more alerts corresponding to the one or more abnormal behaviors, to be provided at least one of: the one or more first communication devices associated with the one or more first users and one or more second communication devices associated with one or more second users; and (b) terminate the one or more tasks performed by the one or more first users to prevent continuous violations on the one or more tasks when a level of the one or more abnormal behaviors exceed a pre-defined threshold.

The plurality of subsystems further comprises a output generating subsystem configured to generate outputs, including at least one of: reports, actionable recommendations, real-time dashboards, and system adaptations for enhanced monitoring and compliance based on at least one of: the processed data associated with the one or more media contents, one or more real-time interactions occurred between the one or more AI models (e.g., LLMs), and the one or more first communication devices associated with the one or more first users, and one or more automated decisions made by the one or more AI models on the one or more tasks.

In another aspect, a non-transitory computer-readable storage medium having instructions stored therein that, when executed by a hardware processor, causes the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The present disclosure will be further explained with additional specificity and detail through the accompanying figures, which illustrate various embodiments of the artificial intelligence-based system for real-time remote monitoring.

Figure 1:
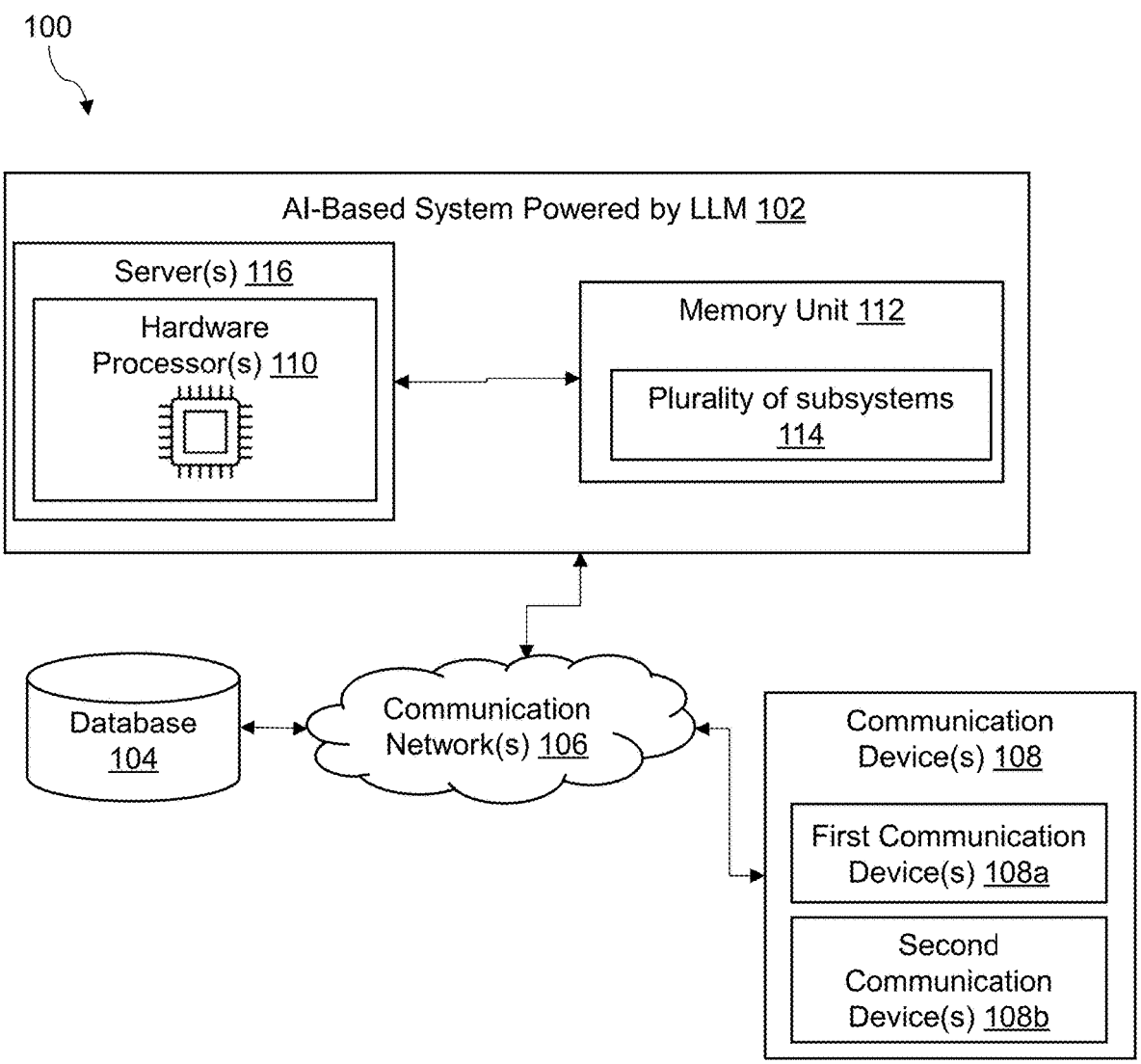
FIG. 1 illustrates an exemplary block diagram representing a network architecture of an artificial intelligence based (AI-based) system for real-time remote monitoring or proctoring of one or more first users during one or more tasks performed by the one or more first users, in accordance with an embodiment of the present disclosure.

It is to be understood by those skilled in the art that the elements in the figures are illustrated for simplicity and clarity and may not be drawn to scale. Some components of the system may be represented by conventional symbols, and only specific details that are pertinent to understanding the various embodiments are shown, avoiding unnecessary complexity.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 4, where similar reference characters denote corresponding features consistently throughout the figures, there are shown preferred embodiments, and these embodiments are described in the context of the following exemplary system and/or method.

FIG. 1 illustrates an exemplary block diagram representing a network architecture 100 of an artificial intelligence based (AI-based) system 102 for real-time remote monitoring or proctoring of one or more first users during one or more tasks performed by the one or more first users, in accordance with an embodiment of the present disclosure.

According to an exemplary embodiment of the present disclosure, the network architecture 100 may include the AI-based system 102, one or more communication networks 106, a database 104, and one or more communication devices 108. The AI-based system 102 may be communicatively coupled to the database 104, and the one or more communication devices 108 via the one or more communication networks 106. The one or more communication networks 106 may be, but not limited to, a wired communication network and/or a wireless communication network.

The wired communication network may comprise, but not limited to, at least one of: Ethernet connections, Fiber Optics, Power Line Communications (PLCs), Serial Communications, Coaxial Cables, Quantum Communication, Advanced Fiber Optics, Hybrid Networks, and the like. The wireless communication network may comprise, but not limited to, at least one of: wireless fidelity (wi-fi), cellular networks (including 4G (fourth generation), 5G (fifth generation), and 6G (sixth generation) networks), Bluetooth, ZigBee, long-range wide area network (LoRaWAN), satellite communication, radio frequency identification (RFID), advanced IoT protocols, mesh networks, non-terrestrial networks (NTNs), near field communication (NFC), and the like.

The one or more communication networks 106 are configured to facilitate seamless data exchange and communication between the AI-based system 102 and the database 104 for real-time data analysis and processing. Additionally, the one or more communication networks 106 enable interaction with the one or more communication devices 108, which may be used for inputting, reviewing, or modifying data.

In an exemplary embodiment, the database 104 may include, but not limited to, storing, and managing data from one or more input sources, including but not limited to video, audio, biometric sensors, environmental sensors, or other data capturing devices herein after referred to as data. The database 104 serves as a central repository for all relevant data, enabling efficient data retrieval and analysis to support decision-making processes. The database 104 facilitates the operation of the AI-based system 102 by serving as a centralized hub for storing and managing all relevant data, such as the video data, the audio data, and the one or more alerts. The database 104 enables seamless integration of data management with system performance, ensuring the AI-based system 102 operates efficiently and securely. Furthermore, the database 104 may manage user access controls, configuration settings, and system logs, providing a comprehensive solution for data management and a security within the network architecture 100.

In an exemplary embodiment, the one or more communication devices 108 may represent various network endpoints, such as, but not limited to, user devices, mobile devices, smartphones, Personal Digital Assistants (PDAs), tablet computers, phablet computers, wearable computing devices, Virtual Reality/Augmented Reality (VR/AR) devices, laptops, desktops, display interface panels, control panels, human machine interface panels, liquid crystal display (LCD) screens, light-emitting diode (LED) screens, and the like. The one or more communication devices 108 are configured to function as an intermediate unit between the AI-based system 102 and one or more users. The one or more communication devices 108 are equipped with a user interface that allows the one or more users to interact with the AI-based system 102. The user interface may include graphical displays, touchscreens, voice recognition, and other input/output mechanisms that facilitate easy access to data and control functions.

The one or more communication devices 108 may include at least one of: one or more first communication devices 108a associated with one or more first users, and one or more second communication devices 108b associated with one or more second users (e.g., an exam and/or interview administrator). The one or more first communication devices 108a are configured with at least one of: one or more cameras and one or more audio capturing units. The one or more cameras are configured to capture the real-time visual data of at least one of: the one or more first users and first user's surroundings. The one or more audio capturing units are configured to capture the real-time audio data from the one or more second user's an exam and/or interview environment, focusing on both user communication and ambient sounds within the user surroundings.

The one or more first communication devices 108a are configured to capture the audio data and the video data, allowing the AI-based system 102 to monitor the behavior of the one or more users and the user surroundings. The one or more second communication devices 108b may serve as a direct link to the AI-based system 102, allowing the one or more second users (e.g., the exam and/or interview administrator) to receive the real-time one or more alerts about any irregularities detected by the AI-based system 102.

The AI-based system 102 includes one or more computing devices, which may include servers, edge devices, or cloud-based processors, configured with hardware processors here in after referred to as servers 116. The one or more servers 116 are configured with one or more hardware processors 110 and a memory unit 112. The one or more servers 116 may comprise a combination of discrete components, an integrated circuit, an application-specific integrated circuit, a field-programmable gate array, a digital signal processor, or other suitable hardware.

The one or more servers 116 processes the real-time video data and the real-time audio data. The one or more servers 116 facilitate seamless communication between the one or more first communication devices 108a and the one or more second communication devices 108b. The one or more servers 116 handle the transmission of the video data, the audio data, and the one or more alerts, ensuring that the exam and/or interview administrators to receive real-time updates on any suspicious activities detected during the one or more tasks (e.g., exams and/or interviews).

Though few components and a plurality of subsystems 114 are disclosed in FIG. 1, there may be additional components and subsystems which is not shown, such as, but not limited to, ports, routers, repeaters, firewall devices, network devices, the database 104, network attached storage devices, assets, machinery, instruments, facility equipment, emergency management devices, image capturing devices, any other devices, and combination thereof. The person skilled in the art should not be limiting the components/subsystems shown in FIG. 1. Although FIG. 1 illustrates the AI-based system 102, and the one or more communication devices 108 connected to the database 104, one skilled in the art can envision that the AI-based system 102, and the one or more communication devices 108 may be connected to several user devices located at various locations and several databases via the one or more communication networks 106.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the AI-based system 102 as is unique to the present disclosure or necessary for an understanding of the present disclosure is depicted and described. The remainder of the construction and operation of the AI-based system 102 may conform to any of the various current implementations and practices that are known in the art.

Figure 2:
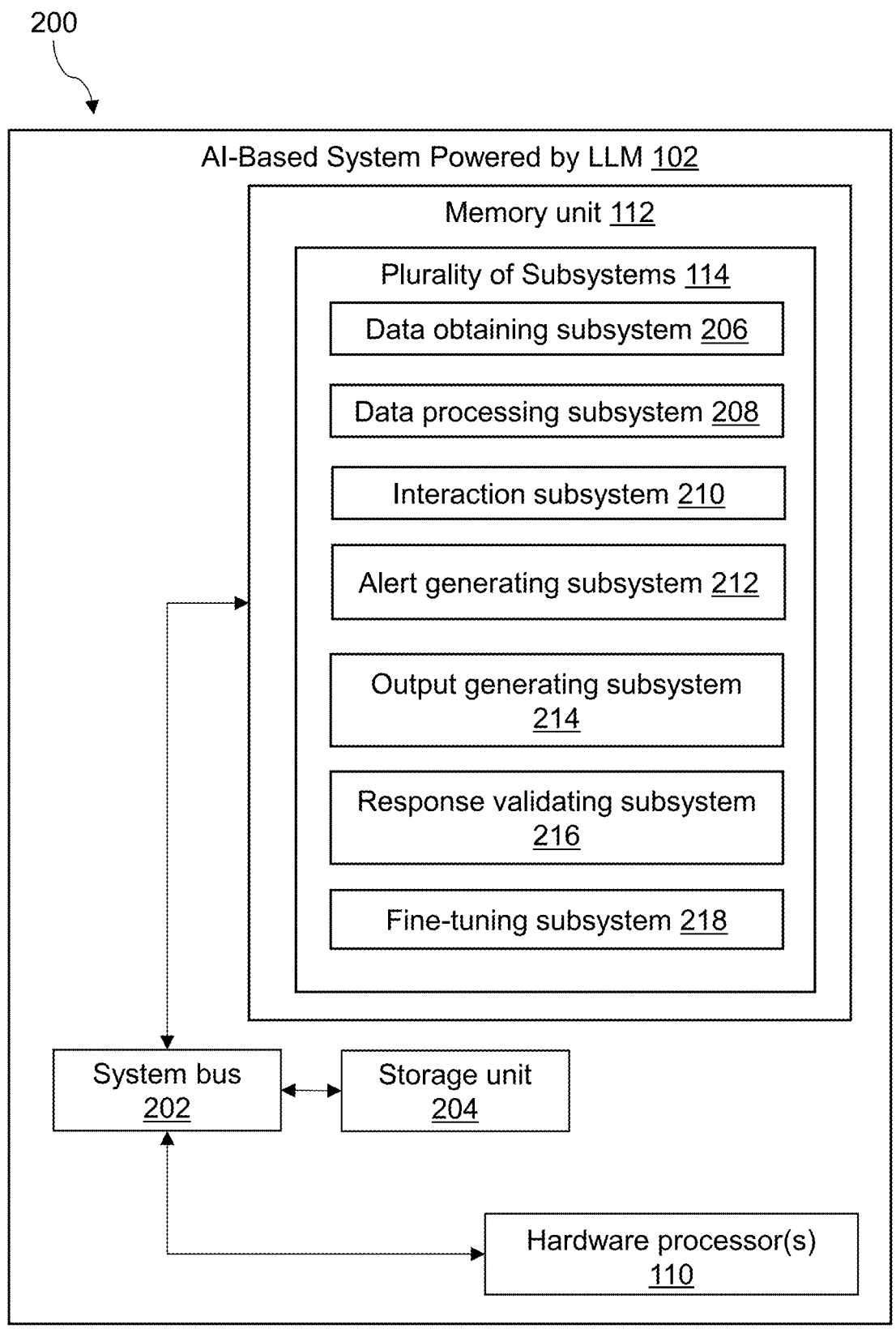
FIG. 2 illustrates a detailed block diagram of the AI-based system, such as those shown in FIG. 1, for real-time remote monitoring or proctoring of the one or more first users during the one or more tasks performed by the one or more first users, in accordance with an embodiment of the present disclosure.

FIG. 2 illustrates a detailed block diagram 200 of the AI-based system 102, such as those shown in FIG. 1, for real-time remote monitoring or proctoring of the one or more first users during the one or more tasks performed by the one or more first users, in accordance with an embodiment of the present disclosure.

In an exemplary embodiment, the AI-based system 102 is configured with one or more artificial intelligence models and one or more machine learning models for real-time remote monitoring. The one or more artificial intelligence models may comprise, but not limited to, large language models (LLMs). The one or more machine learning models may comprise, but not limited to, at least one of: one or more Natural Language Processing (NLP) models, and the like.

The AI-based system 102 (hereinafter referred to as the system 102) comprises at least one of: the one or more servers 116 configured with the one or more hardware processors 110, the memory unit 112, and a storage unit 204. The one or more hardware processors 110, the memory unit 112, and the storage unit 204 are communicatively coupled through a system bus 202 or any similar mechanism. The system bus 202 functions as a central conduit for data transfer and communication between the one or more hardware processors 110, the memory unit 112, and the storage unit 204. The system bus 202 facilitates the efficient exchange of information and instructions, enabling a coordinated operation of the system 102. The system bus 202 may be implemented using various technologies, including, but not limited to, parallel buses, serial buses, or high-speed data transfer interfaces such as, but not limited to, at least one of: universal serial bus (USB), peripheral component interconnect express (PCIe), and similar standards.

The memory unit 112 is operatively connected to the one or more hardware processors 110. The memory unit 112 comprises the set of computer-readable instructions in the form of the plurality of subsystems 114. The plurality of subsystems 114 comprises a data obtaining subsystem 206, a data processing subsystem 208, an interaction subsystem 210, an alert generating subsystem 212, an output generating subsystem 214, a response validating subsystem 216, and a fine-tuning subsystem 218. The one or more hardware processors 110 associated within the one or more servers 116, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory unit 112 may be the non-transitory volatile memory and the non-volatile memory. The memory unit 112 may be coupled to communicate with the one or more hardware processors 110, such as being a computer-readable storage medium. The one or more hardware processors 110 may execute machine-readable instructions and/or source code stored in the memory unit 112. A variety of machine-readable instructions may be stored in and accessed from the memory unit 112. The memory unit 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory unit 112 includes the plurality of subsystems 114 stored in the form of machine-readable instructions on any of the above-mentioned storage media and may be in communication with and executed by the one or more hardware processors 110.

The storage unit 204 may be a cloud storage or the database 104 such as those shown in FIG. 1. The storage unit 204 may store, but not limited to, recommended course of action sequences dynamically generated by the system 102. These action sequences comprise data-obtaining, data-processing, alert generating, output-generating, response-validating, fine-tuning, and the like. The storage unit 204 may be any kind of database such as, but not limited to, relational databases, dedicated databases, dynamic databases, monetized databases, scalable databases, cloud databases, distributed databases, any other databases, graph databases, vector databases, and a combination thereof.

In an exemplary embodiment, the plurality of subsystems 114 includes the data obtaining subsystem 206 that is communicatively connected to the one or more hardware processors 110. The data obtaining subsystem 206 is configured to obtain data associated with one or more media contents from the one or more first communication devices 108a associated with the one or more first users. The data associated with the one or more media contents may include at least one of: video data and audio data, from the one or more first communication devices 108a for the system 102 to process the video data and the audio data. The real-time video data is obtained via the one or more cameras associated with the one or more first communication devices 108a, ensuring a continuous visual record of actions of the one or more first users and the first user's surroundings during the one or more tasks (i.e., the exam and/or interview). The video data serves as a primary input for detecting suspicious behaviors, including, but not limited to, at least one of: abnormal eye movements, unauthorized interactions, detecting unauthorized persons, identifying screen sharing or mirroring, tracking eye movements, monitoring for unusual environmental changes using one or more camera feeds and screen feeds, and the like. The real-time audio data is obtained through the one or more audio capturing units (e.g., microphones) associated with the one or more first communication devices 108a, providing an auditory layer of monitoring. The audio data allows the system 102 to detect any irregularities including, but not constrained to, at least one of: unauthorized conversations, background noise, whispered communications, and the like, which may indicate one of: fraudulent actions and external assistance.

In an exemplary embodiment, the plurality of subsystems 114 includes the data processing subsystem 208 that is communicatively connected to the one or more hardware processors 110. The data processing subsystem 208 is configured to process the data associated with the one or more media contents to determine one or more abnormal behaviors of the one or more first users during the one or more tasks performed by the one or more first users, using one or more AI models including but limited to Large Language Models (LLMs).

For processing the data associated with the one or more media contents to determine the one or more abnormal behaviors, using the LLMs, the data processing subsystem 208 is initially configured to obtain the data associated with the one or more media contents, from the data obtaining subsystem 206. The data processing subsystem 208 is further configured to generate one or more patterns corresponding to the data associated with the one or more media contents. The data processing subsystem 208 is further configured to determine whether the generated one or more patterns deviate from one or more protocols associated with the one or more tasks. The data processing subsystem 208 is further configured to determine the one or more abnormal behaviors from the one or more first users during the one or more tasks performed by the one or more first users when the generated one or more patterns deviate from the one or more protocols associated with the one or more tasks.

In other words, the data processing subsystem 208 is configured to perform a real-time analysis of the video data and the audio data to detect potential prohibited behaviors. The data processing subsystem 208 is configured to process the video data using the one or more LLM vision models. The one or more LLM vision models are configured to track user movements, gaze tracking, motion analysis, or equivalent monitoring techniques, and facial expressions to interpret behaviors. For instance, frequent glances away from a screen, erratic hand movements, or interactions with unauthorized objects are flagged as potential violations. The data processing subsystem 208 is configured with the one or more machine learning models. The one or more machine learning models are configured to recognize patterns that deviate from an exam and/or interview protocol. The one or more machine learning models are trained on vast datasets of exam and/or interview data to learn what constitutes suspicious behavior, making the one or more machine learning models adept at identifying subtle cues that may be overlooked by exam and/or interview administrators.

The plurality of subsystems 114 includes the fine-tuning subsystem 218 that is communicatively connected to the one or more hardware processors 110. The fine-tuning subsystem 218 is configured to fine-tune the one or more AI models. For fine-tuning the one or more AI models, the fine-tuning subsystem 218 is initially configured to obtain one or more fine-tuning datasets comprising data associated with one or more historical media contents. The fine-tuning subsystem 218 is further configured to train the one or more AI models (e.g., LLMs) with the data associated with one or more historical media contents, to learn the one or more patterns corresponding to the data associated with the one or more media contents. The fine-tuning subsystem 218 is further configured to determine the one or more abnormal behaviors from the one or more first users during the one or more tasks based on the trained LLMs.

In an embodiment, the data processing subsystem 208 is configured to dynamically detect the one or more abnormal behaviors of the one or more first users during the one or more tasks, using the one or more AI models (e.g., LLM-powered vision based models). For dynamically detecting the one or more abnormal behaviors of the one or more first users, the data processing subsystem 208 is initially configured to obtain the data associated with one or more visual contents from the one or more camera devices configured in the one or more first communication devices 108a. The data processing subsystem 208 is further configured to process the data associated with the one or more visual contents to analyze at least one of: one or more behaviors of the one or more first users and one or more environments where the one or more tasks are conducted, using the one or more AI models.

The data processing subsystem 208 is further configured to compare one or more behavioral patterns associated with at least one of: the one or more behaviors of the one or more first users and the one or more environments, with one or more pre-determined behavioral patterns associated with at least one of: one or more historical behaviors of the one or more first users and one or more historical environments where the one or more tasks are conducted, using the one or more AI models. The data processing subsystem 208 is further configured to dynamically detect the one or more abnormal behaviours of the one or more first users during the one or more tasks when the one or more behavioral patterns exceed a threshold value associated with the one or more pre-determined behavioral patterns.

In other words, the data processing subsystem 208 is configured with LLM-powered vision capabilities, which significantly enhance its ability to detect cheating and unauthorized behavior. The system 102 integrates LLM-based visual processing with traditional computer vision techniques to dynamically interpret candidate behavior and the exam and/or interview environment. The LLM is trained to understand complex visual data and make context-based decisions about what it detects, such as: Identifying facial expressions and micro-expressions that suggest stress, discomfort, or potential deceit. Recognizing suspicious movements, such as frequent glances off-screen or inconsistent body movements, that are often indicative of cheating. Detecting environmental changes, including at least one of: additional people entering the room, unauthorized devices, or changes in lighting, that may signal attempts to circumvent exam and/or interview security protocols.

The data processing subsystem 208 is configured to enhance the system's 102 ability to perform nuanced, highaccuracy monitoring of candidates. The data processing subsystem 208 may distinguish between benign behaviors (like natural eye movement) and more suspicious actions (such as repeated attempts to look at unauthorized materials), which reduces false positives and improves the overall accuracy of the proctoring process.

In another embodiment, the data processing subsystem 208 is configured to detect the one or more abnormal behaviors of the one or more first users during the one or more tasks, using the one or more AI models. For detecting the one or more abnormal behaviors of the one or more first users, the data processing subsystem 208 is initially configured to obtain the data associated with one or more audio contents from the one or more audio capturing devices configured in the one or more first communication devices 108*a*. The data processing subsystem 208 is further configured to identify an unauthorized collaboration in the one or more environments where the one or more tasks are conducted. The unauthorized collaboration is identified by recognizing at least one of: one or more voices and one or more cues of the humans, excluding the one or more first users in the one or more environments. The data processing subsystem 208 is further configured to compare one or more predetermined ambient sounds in the one or more environments with the recognized at least one of: one or more voices and one or more cues of the humans in the one or more environments, using a speech recognition and semantic analysis technique. The data processing subsystem 208 is further configured to detect the one or more abnormal behaviors of the one or more first users during the one or more tasks by differentiating the one or more predetermined ambient sounds and the one or more voices of the humans, in the one or more environments.

In other words, the data processing subsystem 208 is configured to employ Natural Language Processing (NLP) techniques to analyze the audio environment for unauthorized communication or suspicious noises. The data processing subsystem 208 is configured to continuously monitor audio inputs from the candidate's surroundings, identifying potential sources of unauthorized collaboration, such as multiple voices or auditory cues that suggest exam and/or interview tampering. The data processing subsystem 208 is configured to utilize speech recognition and semantic analysis to differentiate between harmless background noise, such as ambient sounds, and intentional cheating behaviors, like someone providing answers. Working in tandem with the LLMs-powered interaction model, the system 102 can verbally interact with the candidate if suspicious audio cues are detected. For example, if multiple voices are heard, the system 102 may prompt the candidate by saying, "Please ensure you are alone during the exam and/or interview," before escalating the situation if necessary. By combining NLP with LLMs-driven conversation, the system 102 ensures more accurate and intelligent monitoring of the exam and/or interview environment, offering a more sophisticated approach compared to systems that rely solely on basic sound detection.

The plurality of subsystems 114 includes the response validating subsystem 216 that is communicatively connected to the one or more hardware processors 110. The response validating subsystem 216 is configured to validate one or more responses associated with the one or more tasks performed by the one or more first users, using the one or more AI models. For validating the one or more responses associated with the one or more tasks, the response validating subsystem 216 is initially configured to obtain the one or more responses associated with the one or more tasks from the one or more first users. In an embodiment, the one or more responses comprise at least one of: one or more written contents and one or more spoken contents, in response to the one or more tasks.

The response validating subsystem 216 is further configured to determine originality of the one or more responses by comparing the one or more responses with one or more prestored datasets comprising one or more prestored responses, using at least one of: advanced natural language processing (NLP) models and the large language models (LLMs). The response validating subsystem 216 is further configured to validate the one or more responses associated with the one or more tasks based on the determination of the originality of the one or more responses.

In other words, the response validating subsystem 216 is configured to employ an AI Detection engine that is responsible for analyzing both written and spoken content to identify plagiarized or AI-generated responses during exams or job interviews. Using advanced natural language processing (NLP) models and LLM-powered algorithms, the response validating subsystem 216 with the AI detection engine is configured to evaluate the originality of responses by comparing the responses against vast datasets, identifying patterns that indicate the use of external AI tools or previously published content. Additionally, the AI Detection Engine tracks speech patterns, timing, and fluency to flag AI-assisted verbal responses, ensuring a comprehensive evaluation of candidate authenticity across both text-based and spoken answers. The response validating subsystem 216 is configured to play a critical role in maintaining the integrity of assessments by providing real-time analysis and generating alerts when potential AI-assisted cheating is detected.

The plurality of subsystems 114 includes the interaction subsystem 210 that is communicatively connected to the one or more hardware processors 110. The interaction subsystem 210 is configured to enhance real-time communication and guidance during the exam and/or interview. The interaction subsystem 210 is configured with the one or more LLMs to actively interact with the one or more first users to provide real-time assistance. By leveraging the one or more LLMs, the system 102 engages in natural, human-like dialogue to guide the one or more users, answer their queries, and mitigate potential technical issues. The interaction subsystem 210 is configured to ensure that the one or more first users follow the exam and/or interview protocols by providing timely instructions or reminders. For instance, if a user of the one or more first users appears confused or exhibits behavior that may suggest a misunderstanding of exam and/or interview instructions (such as looking away from the screen frequently), the interaction subsystem 210 may proactively transmit the one or more alerts to remind the user of the one or more first users to maintain focus or remain in view of the one or more cameras. This functionality creates a more supportive and controlled exam and/or interview environment, assisting the one or more first users without needing human intervention.

The interaction subsystem 210 ensures that the one or more first users adhere to exam and/or interview instructions by issuing the one or more alerts based on their behaviors or audio data. The system 102 uses one or more LLMs to interpret behaviors in context and respond appropriately. For example, if the interaction subsystem 210 detects a user of the one or more first users engaging in unauthorized communication, the interaction subsystem 210 may issue an immediate alert, notifying the user of the one or more first users to stop and warning the user of the one or more first users of potential consequences. The contextual understanding provided by the LLMs enables the interaction subsystem 210 to tailor its responses to the situation, delivering intelligent, conversational, and human-like interactions.

The interaction subsystem 210 (otherwise called LLM-powered interaction subsystem 210) performs several key functions. First, the interaction subsystem 210 provides candidate guidance during the exam and/or interview, offering real-time instructions such as asking the candidate (e.g., the one or more first users) to adjust their camera position or reminding the one or more first users of exam and/or interview rules. This reduces the need for human intervention and ensures that candidates comply with protocols. Secondly, the interaction subsystem 210 handles question clarification by interpreting and responding to procedural queries, such as "Can I take a break?" or "How much time do I have left?", improving the candidate's experience. Lastly, the interaction subsystem 210 helps in addressing non-compliance: when a candidate exhibits behavior that violates exam and/or interview guidelines, like looking off-screen, the system 102 can initiate a conversation with a prompt such as, "Please ensure your eyes remain on the screen." This allows the system 102 to engage in corrective actions without immediately escalating the issue, mimicking the approach human proctors/interviewers would take by issuing warnings before taking further steps.

The LLM-powered interaction subsystem 210 is critical in distinguishing the system 102 from other AI proctoring systems, which typically rely on pre-programmed, static responses. The LLMs enable the system 102 to deliver dynamic, context-aware responses, improving the overall proctoring experience by ensuring both exam and/or interview integrity and examinee and/or interviewee support.

The plurality of subsystems 114 includes the alert generating subsystem 212 that is communicatively connected to the one or more hardware processors 110. The alert generating subsystem 212 is configured to generate one or more alerts (comprising alerts, recommendations, or predictive insights for detecting, responding to, or mitigating abnormal behaviors), to be provided at least one of: the one or more first communication devices 108a associated with the one or more first users and one or more second communication devices 108b associated with the one or more second users.

The alert generating subsystem 212 is configured to continuously analyze one or more flagged events in real time and to generate appropriate alerts without human involvement. For example, if suspicious activities persist after the system 102 has alerted the one or more first users, the alert generating subsystem 212 is configured to transmit the one or more alerts to both the one or more first users and the one or more second users (e.g., the exam and/or interview administrators), ensuring prompt and efficient responses to potential exam and/or interview violations. This automated process provides oversight while minimizing the need for human intervention, improving both the speed and accuracy of responses.

If flagged activity crosses predefined thresholds, the alert generating subsystem 212 may autonomously terminate the exam and/or interview to prevent continued violations. If certain behaviors exceed the predefined threshold, the alert generating subsystem 212 automatically at least one of: terminates the exam and/or interview and notifies the exam and/or interview administrators for further review. This ensures that responses are proportionate to the severity of the detected issue, creating a balanced and fair approach to exam monitoring. In the case of interview, this decision can also be that of the interviewer and the system 102 can only make a recommendation.

What sets the system 102 apart is also the ability to engage candidates in real time through the LLM-powered interaction subsystem 210 before escalating an issue to an alert. For instance, if suspicious eye movement is detected, the alert generating subsystem 212 may prompt the candidate to keep their eyes on the screen rather than immediately flagging the incident, allowing for a more nuanced approach. If the behavior persists despite these corrective measures, the alert generating subsystem 212 escalates the issue, generating an alert for the exam and/or interview administrator. This layered approach helps reduce false positives, ensuring that only genuinely suspicious behavior is flagged for administrative review.

The plurality of subsystems 114 includes the output generating subsystem 214 that is communicatively connected to the one or more hardware processors 110. The output generating subsystem 214 is configured to generate one or more outputs including at least one of: one or more reports, one or more actionable recommendations, real-time dashboards, and system adaptations for enhanced monitoring and compliance, based on at least one of: the processed data associated with the one or more media contents, one or more real-time interactions occurred between the one or more AI models, and the one or more first communication devices 108a associated with the one or more first users, and one or more automated decisions made by the one or more AI models on the one or more tasks. In an embodiment, the one or more outputs may further include information associated with at least one of: the one or more abnormal behaviors, timeline of flagged incidents associated with the one or more abnormal behaviors, evaluation of performance of the one or more first users during the one or more tasks.

The output generating subsystem 214 is configured to compile and structure all the information collected and analyzed throughout the exam and/or interview session. The output generating subsystem 214 is configured to gather all the information including video analysis, audio monitoring, real-time interactions, system 102 interventions, and automated decisions made by the system 102. This ensures that all relevant information is consolidated in one place, providing a complete overview of the exam and/or interview. The output generating subsystem 214 is configured to highlight and document any anomalies or suspicious behaviors identified during the exam and/or interview. These incidents are flagged based on the predefined thresholds or unusual patterns detected in at least one of the: video data and audio data, giving the one or more second users (e.g., the exam and/or interview administrators) a clear record of events that may require attention.

The output generating subsystem 214 is configured to generate one or more comprehensive outputs that detail the entire exam and/or interview session. The output may comprise, but not limited to, at least one of a: timeline of flagged incidents, interactions between the system 102 and the one or more first users, an evaluation of the user's overall performance, and the like. The one or more outputs are configured to provide a holistic view of the user's behavior during the exam, providing insights into whether the exam and/or interview is conducted fairly or if there are any violations.

The exam and/or interview administrators may view the one or more outputs through the one or more user interfaces associated with the one or more second communication devices 108b. The system 102 further provides a real-time dashboard where the exam and/or interview administrators may monitor the one or more alerts as they are triggered by the system 102. This allows for immediate oversight and intervention, if necessary, particularly for high-stakes exams and/or interviews where time-sensitive decisions may be required. Once the exam and/or interview concludes, the system 102 allows the exam and/or interview administrators to retrieve and review the detailed outputs on the user interface associated with the one or more second communication devices 108b. The system 102 supports decision-making by presenting all relevant information and analysis, allowing the exam and/or interview administrators to validate or dismiss incidents based on an evidence provided. The exam and/or interview administrators may either confirm exam and/or interview results if no major violations are found or take appropriate action if significant breaches in the exam and/or interview integrity are documented.

Figure 3:
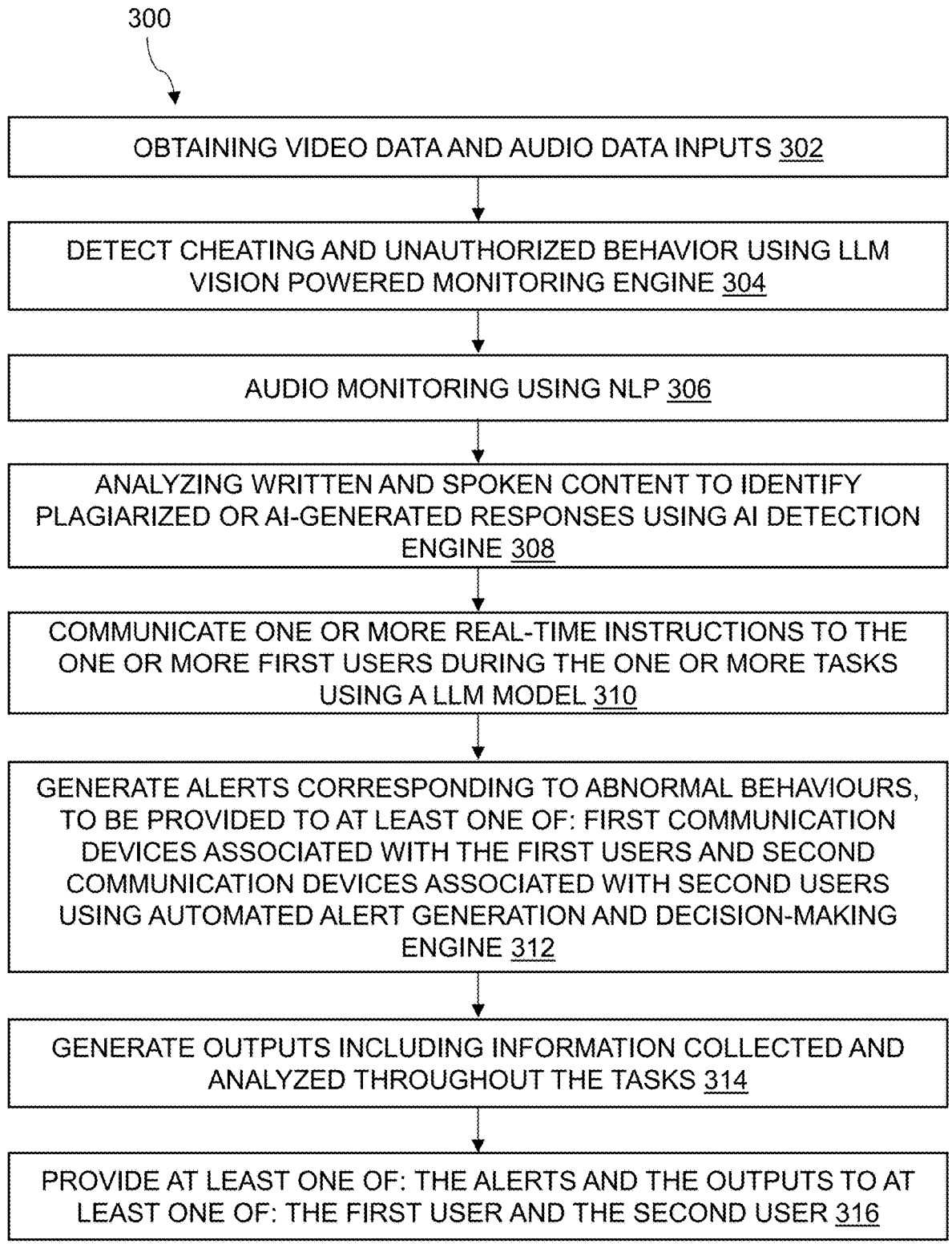
FIG. 3 illustrates an exemplary process flow diagram of the AI-based system operation for real-time remote monitoring or proctoring of the one or more first users during the one or more tasks performed by the one or more first users, in accordance with an embodiment of the present disclosure.

FIG. 3 illustrates an exemplary process flow diagram 300 of the AI-based system operation for real-time remote monitoring or proctoring of the one or more first users during the one or more tasks performed by the one or more first users, in accordance with an embodiment of the present disclosure.

At step 302, the data associated with the one or more media contents are obtained from the one or more first communication devices 108a associated with the one or more first users.

At step 304, the one or more abnormal behaviors of the one or more first users during the one or more tasks, are dynamically detected using the one or more AI models (e.g., LLM-powered vision based model).

At step 306, the unauthorized collaboration is identified by recognizing at least one of: one or more voices and one or more cues of the humans, excluding the one or more first users in the one or more environments, using the Natural Language Processing (NLP) techniques.

At step 308, the one or more written and spoken contents are analyzed to identify plagiarized or AI-generated responses during exams or job interviews, using the AI Detection engine.

At step 310, the one or more real-time instructions or assistances are communicated to the one or more first users during the one or more tasks, using the LLMs.

At step 312, the one or more alerts corresponding to the one or more abnormal behaviors, are generated and provided to at least one of: the one or more first communication devices 108a associated with the one or more first users and one or more second communication devices 108b associated with the one or more second users.

At step 314, the one or more outputs including the information, are generated. The information may be collected and analyzed throughout the exam and/or interview session.

At step 316, at least one of: the one or more alerts and the one or more outputs, are provided to at least one of: the one or more first users and the one or more second users.

Figure 4:
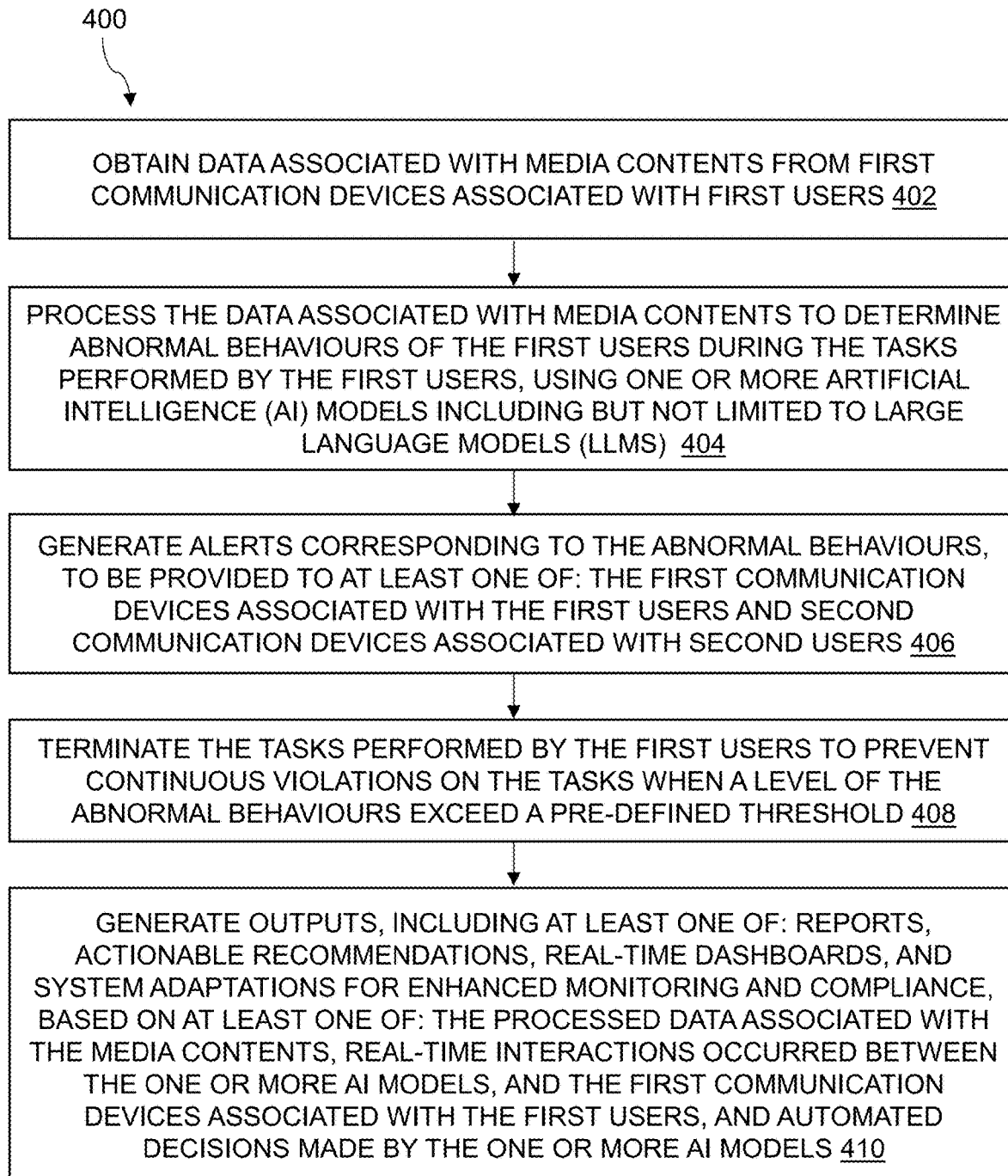
FIG. 4 is a flow diagram illustrating an artificial intelligence based (AI-based) method for real-time remote monitoring or proctoring of the one or more first users during the one or more tasks performed by the one or more first users, in accordance with an embodiment of the present disclosure.

FIG. 4 is a flow diagram illustrating an artificial intelligence based (AI-based) method 400 for real-time remote monitoring or proctoring of the one or more first users during the one or more tasks performed by the one or more first users, in accordance with an embodiment of the present disclosure.

At step 402, the data associated with the one or more media contents are obtained from the one or more first communication devices 108a associated with the one or more first users.

At step 404, the data associated with the one or more media contents are processed to determine the one or more abnormal behaviors of the one or more first users during the one or more tasks performed by the one or more first users, using the one or more AI models.

At step 406, the one or more alerts corresponding to the one or more abnormal behaviors, are generated to be provided at least one of: the one or more first communication devices 108a associated with the one or more first users and the one or more second communication devices 108b associated with the one or more second users.

At step 408, the one or more tasks performed by the one or more first users are terminated to prevent continuous violations on the one or more tasks when the level of the one or more abnormal behaviors exceed the pre-defined threshold.

At step 410, the one or more outputs are generated, wherein the one or more outputs include the information associated with at least one of: the one or more abnormal behaviors, the timeline of flagged incidents associated with the one or more abnormal behaviors, the evaluation of performance of the one or more first users during the one or more tasks based on at least one of: the processed data associated with the one or more media contents, the one or more real-time interactions occurred between the one or more AI models (e.g., LLMs), and the one or more first communication devices 108a associated with the one or more first users, and the one or more automated decisions made by at least one of: the one or more AI models on the one or more tasks.

Numerous advantages of the present disclosure may be apparent from the discussion above. In accordance with the present disclosure, the system 102 for real-time remote proctoring or monitoring of the one or more first users is disclosed. The system 102 provides a complete suite of proctoring functions, combining real-time monitoring, user interaction, assistance, and automated reporting, mimicking the role of the one or more second users (e.g., the exam and/or interview administrators). The system 102 provides real-time, intelligent assistance and support to the one or more first users, enhancing their experience and reducing stress. The system 102 provides superior detection of a wide range of the suspicious behaviors, ensuring a higher level of the exam and/or interview integrity and security compared to traditional and even other AI-enhanced proctoring solutions. By automating much of a proctoring process, the system 102 reduces the need for extensive human oversight, lowering operational costs and allowing for more scalable exam and/or interview administration. Further, the system's gaze tracking and screen reflection analysis detect off-screen devices and AI teleprompters, while speech rhythm analysis identifies delayed or AI-generated responses by analyzing irregular speech patterns.

This disclosure focuses on leveraging the Large Language Models (LLMs), to ensure the integrity of remote assessments by detecting unauthorized behavior, AI-assisted cheating, and plagiarized content in real-time.

The system 102 autonomously performs and enhances full spectrum of exam and/or interview proctoring tasks. The system 102 analyses the video data, the audio data, and screen-sharing feeds to detect anomalies indicative of the fraudulent actions or unauthorized behavior. The system 102 compiles and synthesizes the detailed outputs, using data-driven insights to identify potential academic dishonesty and enhance future exam and/or interview security protocols. The system 102 reduces the need for the exam and/or interview administrators to monitor the one or more first users while giving the exam and/or interview, lowering costs and eliminating human bias while providing scalable, automated proctoring solutions for any number of the one or more first users. The system 102 enhances the user experience by providing interactive support and guidance throughout the exam and/or interview, reducing anxiety and technical challenges, which may impact exam and/or interview performance. The system 102 improves the efficiency and accuracy of post-exam and/or interview analysis by automating the compilation of the detailed outputs, reducing administrative burdens, and increasing the reliability of exam and/or interview results.

The system 102 is configured for seamless integration with existing external systems, including but not limited to Learning Management Systems (LMS), assessment platforms, corporate compliance tools, or secure communication frameworks and various exam and/or interview platforms. The system 102 provides flexible deployment options, including bulk scheduling, secure browser configurations, and customized proctoring settings, enhancing its adaptability across multiple use cases. The system 102 is employed for: remote proctoring for higher education and online learning platforms, professional certification bodies across diverse fields, including finance, healthcare, insurance, and vocational skills, corporate fine-tuning programs and compliance testing environments, government and regulatory body assessments requiring high-security exam and/or interview protocols, and the like.

The system 102 leverages the Large Language Models (LLMs) with multimodal capabilities to process and analyze data from diverse inputs, including text, audio, and visual content. These multimodal capabilities enable the LLMs to perform context-aware assessments by integrating information from one or more sources including but not limited to video, audio, biometric sensors, environmental sensors, or other data capturing devices. For instance, the LLM-powered vision models are configured to analyze video feeds to detect facial expressions, gaze tracking, motion analysis, or equivalent monitoring techniques, and environmental changes, while natural language processing (NLP) models evaluate audio streams to identify unauthorized collaboration or speech patterns. This integration allows the system 102 to dynamically interpret behaviors, ensure protocol compliance, and respond intelligently across multiple modalities, enhancing the accuracy and reliability of monitoring during high-stakes tasks.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the AI-based system 102 either directly or through intervening I/O controllers. Network adapters may also be coupled to the AI-based system 102 to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/AI-based system 102 in accordance with the embodiments herein. The AI-based system 102 herein comprises at least one processor or central processing unit (CPU). The CPUs are interconnected via the system bus 202 to various devices including at least one of: a random-access memory (RAM), read-only memory (ROM), and an input/output (I/O) adapter. The I/O adapter can connect to peripheral devices, including at least one of: disk units and tape drives, or other program storage devices that are readable by the AI-based system 102. The AI-based system 102 can read the inventive instructions on the program storage devices and follow these instructions to execute the methodology of the embodiments herein.

The AI-based system 102 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including at least one of: a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. An artificial intelligence based (AI-based) method for automatically monitoring one or more first users during one or more tasks performed by the one or more first users, the AI-based method comprising:
   obtaining, by one or more hardware processors, data associated with one or more media contents from one or more first communication devices associated with the one or more first users;
   processing, by the one or more hardware processors, the data associated with the one or more media contents to determine one or more abnormal behaviors of the one or more first users during the one or more tasks performed by the one or more first users, using one or more AI models;
   obtaining, by the one or more hardware processors, one or more responses associated with the one or more tasks from the one or more first users, wherein the one or more responses comprise at least one of: one or more written contents and one or more spoken contents, in response to the one or more tasks;
   determining, by the one or more hardware processors, originality of the one or more responses by comparing the one or more responses with one or more prestored datasets comprising one or more prestored responses, using the one or more AI models; and
   validating, by the one or more hardware processors, the one or more responses associated with the one or more tasks based on the determination of the originality of the one or more responses;
   generating, by the one or more hardware processors, one or more alerts corresponding to at least one of: the one or more abnormal behaviors, and the one or more responses fail to validate, to be provided to at least one of: the one or more first communication devices associated with the one or more first users and one or more second communication devices associated with one or more second users;
   terminating, by the one or more hardware processors, the one or more tasks performed by the one or more first users to prevent continuous violations on the one or more tasks based on at least one of: when a level of the one or more abnormal behaviors exceed a pre-defined threshold, and the one or more responses fail to validate; and
   generating, by the one or more hardware processors, one or more outputs comprising at least one of: one or more reports, one or more actionable recommendations, real-time dashboards, and system adaptations for optimized monitoring and compliance, based on at least one of: the processed data associated with the one or more media contents, one or more real-time interactions occurred between the one or more AI models, and the one or more first communication devices associated with the one or more first users, and one or more automated decisions made by the one or more AI models on the one or more tasks.

2. The AI-based method of claim 1, wherein processing the data associated with the one or more media contents to determine the one or more abnormal behaviors, using the one or more AI models, comprises:
   obtaining, by the one or more hardware processors, the data associated with the one or more media contents, from a data obtaining subsystem;
   generating, by the one or more hardware processors, one or more patterns corresponding to the data associated with the one or more media contents;
   determining, by the one or more hardware processors, whether the generated one or more patterns deviate from one or more protocols associated with the one or more tasks; and
   determining, by the one or more hardware processors, the one or more abnormal behaviors from the one or more first users during the one or more tasks performed by the one or more first users when the generated one or more patterns deviate from the one or more protocols associated with the one or more tasks.

3. The AI-based method of claim 1, further comprising fine-tuning, by the one or more hardware processors, the one or more AI models, wherein fine-tuning the one or more AI models comprises:
   obtaining, by the one or more hardware processors, one or more fine-tuning datasets comprising data associated with one or more historical media contents;
   fine-tuning, by the one or more hardware processors, the one or more AI models with the data associated with one or more historical media contents, to learn one or more patterns corresponding to the data associated with the one or more media contents; and
   determining, by the one or more hardware processors, the one or more abnormal behaviors from the one or more first users during the one or more tasks based on the fine-tuned one or more AI models.

4. The AI-based method of claim 1, further comprising dynamically detecting, by the one or more hardware processors, the one or more abnormal behaviors of the one or more first users during the one or more tasks, using the one or more AI models, by:
   obtaining, by the one or more hardware processors, data associated with one or more visual contents from one or more camera devices configured in the one or more first communication devices;
   processing, by the one or more hardware processors, the data associated with the one or more visual contents to analyze at least one of: one or more behaviors of the one or more first users and one or more environments where the one or more tasks are conducted, using the one or more AI models;

comparing, by the one or more hardware processors, one or more behavioral patterns associated with at least one of: the one or more behaviors of the one or more first users and the one or more environments, with one or more pre-determined behavioral patterns associated with at least one of: one or more historical behaviors of the one or more first users and one or more historical environments where the one or more tasks are conducted, using the one or more AI models; and dynamically detecting, by the one or more hardware processors, the one or more abnormal behaviors of the one or more first users during the one or more tasks when the one or more behavioral patterns exceed a threshold value associated with the one or more pre-determined behavioral patterns.

5. The AI-based method of claim 4, wherein the one or more visual contents of the one or more abnormal behaviors of the one or more first users comprise at least one of: one or more facial expressions, one or more micro-expressions indicating stress, discomfort of the one or more first users, one or more false activities, frequent looks away from a screen, one or more inconsistent body movements of the one or more first users, one or more humans entering into the one or more environments, unauthorized devices available in the one or more environments, and changes in lightings during which the one or more first users violate the one or more protocols associated with the one or more tasks.

6. The AI-based method of claim 1, further comprising detecting, by the one or more hardware processors, the one or more abnormal behaviors of the one or more first users during the one or more tasks, using the one or more AI models, by:

obtaining, by the one or more hardware processors, data associated with one or more audio contents from one or more audio capturing devices configured in the one or more first communication devices;

identifying, by the one or more hardware processors, an unauthorized collaboration in the one or more environments where the one or more tasks are conducted, wherein the unauthorized collaboration is identified by recognizing at least one of: one or more voices and one or more cues of the humans, excluding the one or more first users in the one or more environments;

comparing, by the one or more hardware processors, one or more predetermined ambient sounds in the one or more environments with the recognized at least one of: one or more voices and one or more cues of the humans in the one or more environments, using a speech recognition and semantic analysis technique; and detecting, by the one or more hardware processors, the one or more abnormal behaviors of the one or more first users during the one or more tasks by differentiating the one or more predetermined ambient sounds and the one or more voices of the humans, in the one or more environments.

7. The AI-based method of claim 1, further comprising communicating, by the one or more hardware processors, one or more real-time instructions to the one or more first users during the one or more tasks, using the one or more AI models, wherein communicating the one or more real-time instructions comprise at least one of: providing timely instructions and reminders about the one or more protocols associated with the one or more tasks, providing answers to one or more procedural questions during the one or more tasks, and providing the one or more alerts when the one or more first users exhibit at least one of: the one or more abnormal behaviors and the one or more responses fail to validate.

8. An artificial intelligence based (AI-based) system for automatically monitoring one or more first users during one or more tasks performed by the one or more first users, the AI-based system comprising:

one or more hardware processors;

a memory coupled to the one or more hardware processors, wherein the memory comprises a plurality of subsystems in form of programmable instructions executable by the one or more hardware processors, and wherein the plurality of subsystems comprises:

a data obtaining subsystem configured to obtain data associated with one or more media contents from one or more first communication devices associated with the one or more first users;

a data processing subsystem configured to process the data associated with the one or more media contents to determine one or more abnormal behaviors of the one or more first users during the one or more tasks performed by the one or more first users, using one or more AI models;

a response validating subsystem configured to validate one or more responses associated with the one or more tasks performed by the one or more first users, using the one or more AI models, wherein in validating the one or more responses associated with the one or more tasks, the response validating subsystem is configured to:

obtain the one or more responses associated with the one or more tasks from the one or more first users, wherein the one or more responses comprise at least one of: one or more written contents and one or more spoken contents, in response to the one or more tasks;

determine originality of the one or more responses by comparing the one or more responses with one or more prestored datasets comprising one or more prestored responses, using one or more AI models; and validate the one or more responses associated with the one or more tasks based on the determination of the originality of the one or more responses;

an alert generating subsystem configured to:

generate one or more alerts corresponding to at least one of: the one or more abnormal behaviors, and the one or more responses fail to validate, to be provided at least one of: the one or more first communication devices associated with the one or more first users and one or more second communication devices associated with one or more second users; and terminate the one or more tasks performed by the one or more first users to prevent continuous violations on the one or more tasks based on at least one of: when a level of the one or more abnormal behaviors exceed a pre-defined threshold, and the one or more responses fail to validate; and an output generating subsystem configured to generate one or more outputs comprising at least one of: one or more reports, one or more actionable recommendations, real-time dashboards, and system adaptations for optimized monitoring and compliance, based on at least one of: the processed data associated with the one or more media contents, one or more real-time interactions occurred between one or more AI models, and the one or more first communication devices associated with the one or more first users, and one or more automated decisions made by the one or more AI models on the one or more tasks.

9. The AI-based system of claim 8, wherein in processing the data associated with the one or more media contents to determine the one or more abnormal behaviors, using the one or more AI models, the data processing subsystem is configured to:
  obtain the data associated with the one or more media contents, from a data obtaining subsystem;
  generate one or more patterns corresponding to the data associated with the one or more media contents;
  determine whether the generated one or more patterns deviate from one or more protocols associated with the one or more tasks; and
  determine the one or more abnormal behaviors from the one or more first users during the one or more tasks performed by the one or more first users when the generated one or more patterns deviate from the one or more protocols associated with the one or more tasks.

10. The AI-based system of claim 8, further comprising a fine-tuning subsystem configured to fine-tune the one or more AI models, wherein in fine-tuning the one or more AI models, the fine-tuning subsystem is configured to:
  obtain one or more fine-tuning datasets comprising data associated with one or more historical media contents;
  fine-tune the one or more AI models with the data associated with one or more historical media contents, to learn one or more patterns corresponding to the data associated with the one or more media contents; and
  determine the one or more abnormal behaviors from the one or more first users during the one or more tasks based on the fine-tuned one or more AI models.

11. The AI-based system of claim 8, wherein the data processing subsystem is further configured to dynamically detect the one or more abnormal behaviors of the one or more first users during the one or more tasks, using the one or more AI models, by:
  obtaining data associated with one or more visual contents from one or more camera devices configured in the one or more first communication devices;
  processing the data associated with the one or more visual contents to analyze at least one of: one or more behaviors of the one or more first users and one or more environments where the one or more tasks are conducted, using the one or more AI models;
  comparing one or more behavioral patterns associated with at least one of: the one or more behaviors of the one or more first users and the one or more environments, with one or more pre-determined behavioral patterns associated with at least one of: one or more historical behaviors of the one or more first users and one or more historical environments where the one or more tasks are conducted, using the one or more AI models; and
  dynamically detecting the one or more abnormal behaviors of the one or more first users during the one or more tasks when the one or more behavioral patterns exceed a threshold value associated with the one or more pre-determined behavioral patterns.

12. The AI-based system of claim 11, wherein the one or more visual contents of the one or more abnormal behaviors of the one or more first users comprise at least one of: one or more facial expressions, one or more micro-expressions indicating stress, discomfort of the one or more first users, one or more false activities, frequent looks away from a screen, one or more inconsistent body movements of the one or more first users, one or more humans entering into the one or more environments, unauthorized devices available in the one or more environments, and changes in lightings during which the one or more first users violate the one or more protocols associated with the one or more tasks.

13. The AI-based system of claim 8, wherein the data processing subsystem is further configured to detect the one or more abnormal behaviors of the one or more first users during the one or more tasks, using the one or more AI models, by:
  obtaining data associated with one or more audio contents from one or more audio capturing devices configured in the one or more first communication devices;
  identifying an unauthorized collaboration in the one or more environments where the one or more tasks are conducted, wherein the unauthorized collaboration is identified by recognizing at least one of: one or more voices and one or more cues of the humans, excluding the one or more first users in the one or more environments;
  comparing one or more predetermined ambient sounds in the one or more environments with the recognized at least one of: one or more voices and one or more cues of the humans in the one or more environments, using a speech recognition and semantic analysis technique; and
  detecting the one or more abnormal behaviors of the one or more first users during the one or more tasks by differentiating the one or more predetermined ambient sounds and the one or more voices of the humans, in the one or more environments.

14. The AI-based system of claim 8, further comprising an interaction subsystem configured to communicate one or more real-time instructions to the one or more first users during the one or more tasks, using the one or more AI models, wherein communicating the one or more real-time instructions comprise at least one of:
  providing timely instructions and reminders about the one or more protocols associated with the one or more tasks, providing answers to one or more procedural questions during the one or more tasks, and providing the one or more alerts when the one or more first users exhibit at least one of: the one or more abnormal behaviors and the one or more responses fail to validate.

15. A non-transitory computer-readable storage medium having instructions stored therein that when executed by one or more hardware processors, cause the one or more hardware processors to execute operations of:
  obtaining data associated with one or more media contents from one or more first communication devices associated with one or more first users;
  processing the data associated with one or more media contents to determine one or more abnormal behaviors of the one or more first users during the one or more tasks performed by the one or more first users, using one or more AI models;
  obtaining, by the one or more hardware processors, one or more responses associated with the one or more tasks from the one or more first users, wherein the one or more responses comprise at least one of: one or more written contents and one or more spoken contents, in response to the one or more tasks;
  determining, by the one or more hardware processors, originality of the one or more responses by comparing the one or more responses with one or more prestored datasets comprising one or more prestored responses, using the one or more AI models; and validating, by the one or more hardware processors, the one or more responses associated with the one or more tasks based on the determination of the originality of the one or more responses;

generating one or more alerts corresponding to at least one of: the one or more abnormal behaviors, and the one or more responses fail to validate, to be provided to at least one of: the one or more first communication devices associated with the one or more first users and one or more second communication devices associated with one or more second users;

terminating the one or more tasks performed by the one or more first users to prevent continuous violations on the one or more tasks based on at least one of: when a level of the one or more abnormal behaviors exceed a pre-defined threshold, and the one or more responses fail to validate; and generating one or more outputs comprising at least one of: one or more reports, one or more actionable recommendations, real-time dashboards, and system adaptations for optimized monitoring and compliance, based on at least one of: the processed data associated with the one or more media contents, one or more real-time interactions occurred between the one or more AI models, and the one or more first communication devices associated with the one or more first users, and one or more automated decisions made the one or more AI models on the one or more tasks.

16. The non-transitory computer-readable storage medium of claim 15, wherein processing the data associated with the one or more media contents to determine the one or more abnormal behaviors, using the one or more AI models, comprises:

obtaining the data associated with the one or more media contents, from a data obtaining subsystem;

generating one or more patterns corresponding to the data associated with the one or more media contents;

determining whether the generated one or more patterns deviate from one or more protocols associated with the one or more tasks; and determining the one or more abnormal behaviors from the one or more first users during the one or more tasks performed by the one or more first users when the generated one or more patterns deviate from the one or more protocols associated with the one or more tasks.

17. The non-transitory computer-readable storage medium of claim 15, further comprising dynamically detecting the one or more abnormal behaviors of the one or more first users during the one or more tasks, using the one or more AI models, by:

obtaining data associated with one or more visual contents from one or more camera devices configured in the one or more first communication devices;

processing the data associated with the one or more visual contents to analyze at least one of: one or more behaviors of the one or more first users and one or more environments where the one or more tasks are conducted, using the one or more AI models;

comparing one or more behavioral patterns associated with at least one of: the one or more behaviors of the one or more first users and the one or more environments, with one or more pre-determined behavioral patterns associated with at least one of: one or more historical behaviors of the one or more first users and one or more historical environments where the one or more tasks are conducted, using the one or more AI models; and dynamically detecting the one or more abnormal behaviors of the one or more first users during the one or more tasks when the one or more behavioral patterns exceed a threshold value associated with the one or more pre-determined behavioral patterns.

18. The non-transitory computer-readable storage medium of claim 15, further comprising detecting the one or more abnormal behaviors of the one or more first users during the one or more tasks, using the one or more AI models, by:

obtaining data associated with one or more audio contents from one or more audio capturing devices configured in the one or more first communication devices;

identifying an unauthorized collaboration in the one or more environments where the one or more tasks are conducted, wherein the unauthorized collaboration is identified by recognizing at least one of: one or more voices and one or more cues of the humans, excluding the one or more first users in the one or more environments;

comparing one or more predetermined ambient sounds in the one or more environments with the recognized at least one of: one or more voices and one or more cues of the humans in the one or more environments, using a speech recognition and semantic analysis technique; and detecting the one or more abnormal behaviors of the one or more first users during the one or more tasks by differentiating the one or more predetermined ambient sounds and the one or more voices of the humans, in the one or more environments.

\* \* \* \* \*